United States Patent
Tailpied et al.

(10) Patent No.: US 9,878,407 B2
(45) Date of Patent: Jan. 30, 2018

(54) METHOD FOR REMOVING A TURBOFAN ENGINE USING A HEATING DEVICE

(71) Applicant: SNECMA, Paris (FR)

(72) Inventors: Fabrice Tailpied, Verneuil sur Seine (FR); Herve Dagron, Le Gue de Longroi (FR); Cedric Mustiere, Bu (FR)

(73) Assignee: SNECMA, Paris (FR)

( * ) Notice: Subject to any disclaimer, the term of this patent is extended or adjusted under 35 U.S.C. 154(b) by 301 days.

(21) Appl. No.: 14/397,009

(22) PCT Filed: May 2, 2013

(86) PCT No.: PCT/FR2013/050979
§ 371 (c)(1),
(2) Date: Oct. 24, 2014

(87) PCT Pub. No.: WO2013/164552
PCT Pub. Date: Nov. 7, 2013

(65) Prior Publication Data
US 2015/0107107 A1    Apr. 23, 2015

(30) Foreign Application Priority Data
May 2, 2012   (FR) ..................... 12 54031

(51) Int. Cl.
*B23P 19/06*    (2006.01)
*F01D 25/16*    (2006.01)
(Continued)

(52) U.S. Cl.
CPC ............. *B23P 19/06* (2013.01); *B23P 19/042* (2013.01); *F01D 5/005* (2013.01); *F01D 25/16* (2013.01);
(Continued)

(58) Field of Classification Search
CPC ......... B23P 19/06; B23P 19/065; B23P 19/04; B23P 19/042; B25B 23/14;
(Continued)

(56) References Cited

U.S. PATENT DOCUMENTS

| 5,575,145 A | 11/1996 | O'Neill et al. |
| 7,128,529 B2 * | 10/2006 | Le Jeune ................ F01D 5/025 415/229 |

(Continued)

FOREIGN PATENT DOCUMENTS

| EP | 1 498 624 A1 | 1/2005 |
| EP | 1 757 777 A1 | 2/2007 |
| EP | 1 813 792 A1 | 8/2007 |

OTHER PUBLICATIONS

International Search Report dated Jun. 24, 2013, in PCT/FR13/050979 filed May 2, 2013.

*Primary Examiner* — Sarang Afzali
(74) *Attorney, Agent, or Firm* — Oblon, McClelland, Maier & Neustadt, L.L.P.

(57) ABSTRACT

A method for removing a twin-spool turbine including a front fan, a HP module with a HP rotor, and a LP turbine module, an intermediate casing including a support bearing for the HP rotor, the HP rotor being retained in the bearing by a link nut, the method including inserting a tool for unscrewing the link nut after having released access to the link nut, and preheating the link nut before starting the unscrewing tool.

7 Claims, 5 Drawing Sheets

(51) Int. Cl.
*B23P 19/04* (2006.01)
*F02C 7/06* (2006.01)
*F02C 7/36* (2006.01)
*F01D 5/00* (2006.01)

(52) U.S. Cl.
CPC .................. *F02C 7/06* (2013.01); *F02C 7/36* (2013.01); *F05D 2230/70* (2013.01); *Y10T 29/49233* (2015.01); *Y10T 29/49245* (2015.01); *Y10T 29/49318* (2015.01); *Y10T 29/49822* (2015.01)

(58) Field of Classification Search
CPC ............. F05D 2230/60; F05D 2230/64; F05D 2230/68; F05D 2230/70; F01D 25/285; F01D 25/16; F01D 5/005; F01D 5/066; F02C 7/06; F02C 7/36; Y10T 29/49233; Y10T 29/49238; Y10T 29/49245; Y10T 29/49318; Y10T 29/49815; Y10T 29/49819; Y10T 29/49822

See application file for complete search history.

(56) References Cited

U.S. PATENT DOCUMENTS

| | | | |
|---|---|---|---|
| 7,350,827 B2* | 4/2008 | Zeigler | F16L 5/02 24/270 |
| 7,690,206 B2* | 4/2010 | Servant | F01D 5/026 60/792 |
| 7,885,780 B2* | 2/2011 | Lucke | G01L 25/003 702/108 |
| 2005/0013696 A1 | 1/2005 | Le Jeune et al. | |
| 2007/0044307 A1 | 3/2007 | Bergerot et al. | |
| 2007/0177936 A1 | 8/2007 | Servant | |
| 2012/0151735 A1* | 6/2012 | Thomas | B25B 27/062 29/426.5 |

* cited by examiner

METHOD FOR REMOVING A TURBOFAN ENGINE USING A HEATING DEVICE

TECHNICAL FIELD OF THE INVENTION

The present invention relates to dismantling a gas turbine engine, in particular removing the nut connecting the high-pressure rotor to the front bearing in a twin-spool, front-fan turbofan.

PRIOR ART

A twin-spool, front-fan turbofan comprises two coaxial rotors supported by bearings housed in the hubs of two structural casing elements: referred to in the art as the intermediate casing and the exhaust casing. At the front of the engine, the bearings are mounted in the intermediate casing and, at the rear, one or more bearings are housed in the exhaust casing. In an engine such as the CFM56, the rotating assemblies are thus mounted on five bearings: three at the front and two at the rear. At the front, the fan shaft and the shaft of the low-pressure (LP) rotor are respectively mounted in the two first bearings. The high-pressure (HP) rotor is supported by bearing no. 3, downstream of the first two. At the rear, this same HP rotor is supported by an inter-shaft bearing and the shaft of the LP rotor is supported by a bearing mounted in the hub of the exhaust casing.

After a period of operation, each engine is sent to the workshop for example for a complete overhaul, in which it is entirely dismantled and each part is cleaned, repaired or replaced if necessary. Dismantling comprises several steps, including that of removing the LP turbine module at the rear and then the module formed by the HP spool. The rotor of the HP spool comprises an upstream journal which is retained in bearing no. 3 by a connecting nut which must be unscrewed. This operation has a certain degree of difficulty per se due to the relative inaccessibility of this part. The connecting nut is a cylindrical, threaded part which serves to immobilize the upstream end of the journal of the HP rotor with respect to the inner race of the bearing. This nut comprises four teeth cut into the cylindrical wall and is located in the upstream extension of the threaded portion.

The standard procedure starts with removing the LP module to the rear and extracting the LP shaft, also to the rear. Access to the connecting nut is then possible via the central passage left free by the LP shaft. After putting in place a wedging device, which replaces the bearing which has been removed, and an internal guiding tube, an appropriately shaped tool provided with two retractable lugs at the end of a cylindrical tube is introduced into this passage as far as the nut, then the two lugs are deployed radially such that they engage against two of the four teeth of the connecting nut. As the HP rotor is prevented from rotating by a wedge, turning the tool about its axis allows the nut to be unscrewed.

This operation is delicate inasmuch as the teeth of the nut must not be damaged and the nut must not be deformed. To that end, the instructions of the engine manufacturer prescribe a maximum torque to be applied.

If the connecting nut cannot be unscrewed in this way, the procedure then consists in removing the assembly consisting of the fan and the low-pressure (LP) compressor in order to gain access to the nut via the front of the engine. Once this path is open, an appropriately shaped tool is introduced along the axis of the engine as far as the connecting nut. The head of the tool is adapted to the shape of all the teeth of the nut, such that it is possible to apply a larger torque than before and increase the chances of managing to loosen it.

However, if the connecting nut can still not be removed by this operation, it has to be cut. Cutting the nut, which is not an inexpensive or straightforward solution, is to be avoided as not only must the nut be replaced but there is a risk of the resulting chips and filings contaminating the gearing located in the immediate vicinity, which would require these parts to be removed and cleaned. This gearing, known as the IGB, serves to drive the radial arm connected to the gearbox for the accessories, the AGB.

With increasing duration or number of operating cycles of the engines, and the use thereof, where relevant, in aggressive environments, it is observed that dismantling now leads more often to the connecting nut being cut due to seizing of the nut.

Seizing of the connecting nut is due to multiple factors:
coking of the grease resulting from heating of the part,
deformation of the nut during loosening, due to the torsion forces generated by the permitted torque limit being exceeded,
oxidation of the portions of the nut forming the centering tracks with the journal and the inner race of the rolling bearing.

The present applicant has set itself the objective of developing a method for dismantling a motor, avoiding as far as possible the need to cut the connecting nut.

DISCLOSURE OF THE INVENTION

The invention relates to a twin-spool turbofan comprising a front fan, a HP module with a HP rotor and a LP turbine module, the intermediate casing having a bearing for supporting the HP rotor. The HP rotor is retained in the bearing of the intermediate casing by a connecting nut. The method for dismantling the engine comprises a step of introducing a tool for unscrewing the connecting nut once access to the connecting nut has been cleared, and is characterized in that it comprises a step of heating, beforehand, the connecting nut before engaging the unscrewing tool.

Previous heating to a moderate temperature makes it possible to soften the coked oils gluing together the thread of the connecting nut and that of the journal and also to allow a differential expansion between the cylindrical elements in mutual contact via close-fitting supporting surfaces.

The temperature must be kept below a safe value for the integrity of the parts present. The maximum heating temperature for an exemplary embodiment of the method is 130° C.

Preferably, once the LP turbine module, with its shaft, has been removed, a tubular heating means is introduced from behind into the central space left free by the LP turbine module, along the axis of the engine, and the connecting nut is heated from the inside.

In accordance with another feature, the heating means comprises a tube with a means for blowing hot air in via one end and radial openings at the other end so as to guide the hot air radially toward the connecting nut.

After heating the nut, a rear unscrewing tool is introduced. The tool preferably comprises a tube and a plurality of fingers which are retractable between a position in which they are housed within the tube, such that the tube can be introduced as far as the nut, and a position in which they are deployed radially so as to come into contact with the teeth of the connecting nut. An unscrewing torque is then applied to the tool, the torque being maintained at a value below that at which the forces on the teeth of the nut would risk damaging them.

According to another way of effecting the dismantling, either after an unsuccessful attempt via the rear or directly, the fan is removed so as to free up said connecting nut in the forward direction and putting in place a front unscrewing tool for applying a torque for unscrewing the nut. The front unscrewing tool preferably comprises a tubular element which is provided with teeth of a shape complementary with that of the teeth of the connecting nut; the tubular element is put in place on the nut and an unscrewing torque is applied.

The tubular element is advantageously placed in a support attached to the casing of the engine, said support forming a contact point for applying the unscrewing torque.

It is also necessary to immobilize the rotor of the HP module. To that end, the LP turbine module having been removed, the HP rotor is prevented from rotating by means of a tubular element which is engaged in the space left free by the LP module and which is attached by one end to the casing of the HP module and at the other end is secured in rotation with the HP rotor. As a safety measure, when resistance to unscrewing is observed, it is ascertained that the connecting nut has not seized, by means of a break-action torque wrench calibrated to the maximum permitted torque.

BRIEF DESCRIPTION OF THE FIGURES

The method for removing the connecting nut will now be described in more detail, according to one embodiment given by way of non-limiting example, the description being made with reference to the appended drawings, in which:

FIG. 7 is a section through AA in FIG. 6 showing the tooling in the deployed position and FIG. 8 shows the tool in the retracted position;

DETAILED DESCRIPTION OF THE INVENTION

Figure 1:
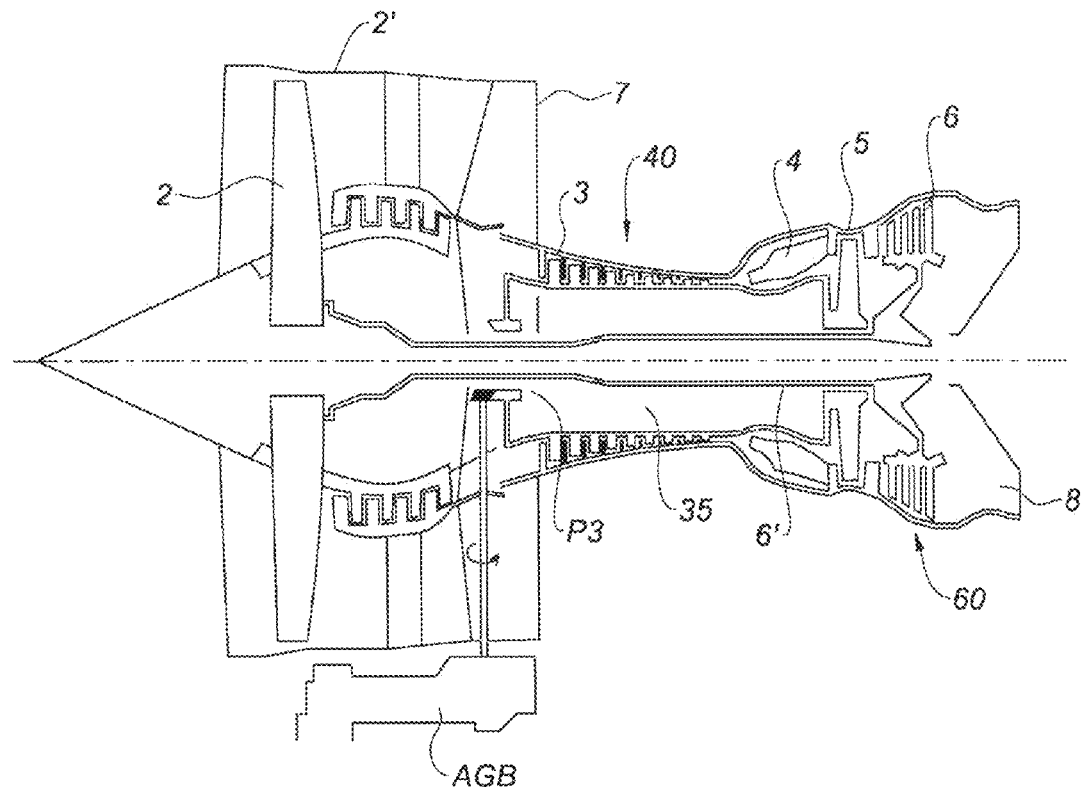
FIG. 1 is a representation in axial section of an engine to which the method according to the invention applies.

The section of FIG. 1 shows a twin-spool, front-fan turbofan 1. This figure shows, from right to left, that is to say from upstream to downstream in the direction of the gas streams, the rotor of the fan 2 inside the fan casing 2'. The fan duct delimited by the casing is split into two concentric annular ducts, one for the primary flow which passes through the engine, the other for the secondary flow which is expelled without having been heated. The primary flow is compressed in the low-pressure boost compressor and then in the HP compressor 3. It is admitted into the combustion chamber 4 where it is heated by combustion of a fuel. The hot gases issuing therefrom are expanded successively in the HP turbine 5 and the LP turbine 6 before being expelled. The rotors are supported within the two structural casings which are the intermediate casing 7—the fan casing being attached on the upstream side thereof—and the exhaust casing 8 to the rear.

The fan 2 with the boost compressor and the LP turbine 6 are connected by a LP turbine shaft 6'. The turbine shaft 6' and the turbine 6 with its casing form, with the exhaust casing 8, the LP turbine module 60.

The HP compressor 3 and the HP turbine 5 form the HP rotor 35 inside the HP spool or module 40. This also comprises the combustion chamber 4. The HP rotor 35 is mounted at the upstream end in the bearing P3 which is supported in the hub of the intermediate casing 7. The gearbox referred to as the IGB, for driving the accessory gearbox (AGB) via a radial shaft housed in an arm of the intermediate casing, is also here.

Figure 2:
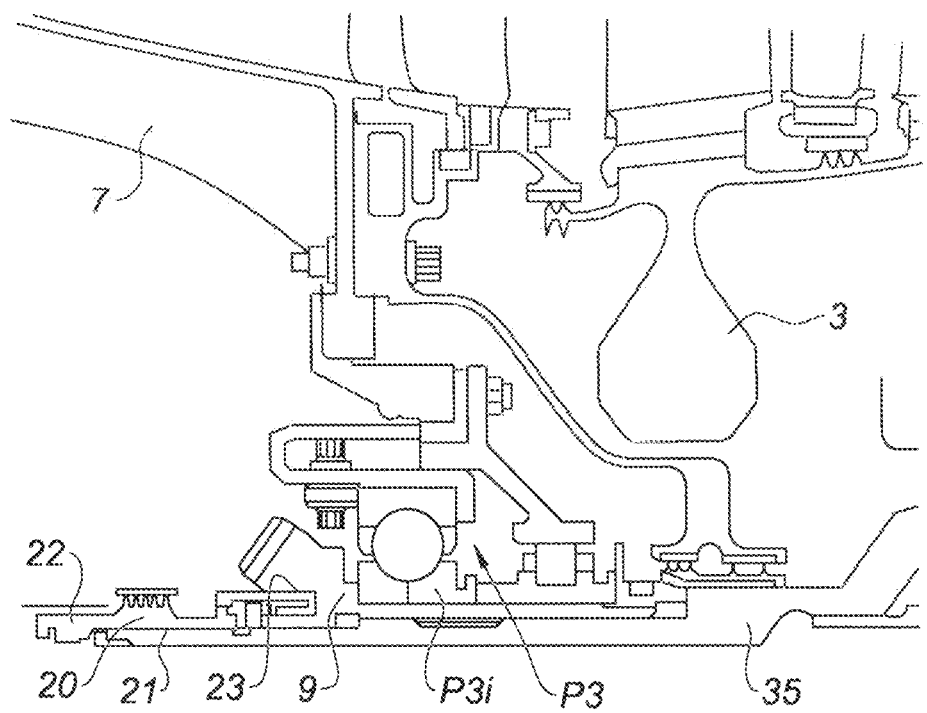
FIG. 2 is an axial half-section view showing, in situ, the nut which connects the HP rotor to the front bearing in the intermediate casing and which is to be removed.

FIG. 2 shows this portion of the engine in more detail; the upstream journal of the rotor 35 is housed in the inner race P3i of the rolling bearing P3 via the intermediary of the pinion 9 of the IGB gearing. The connecting screw 20 is screwed at 21 to the end of the rotor 35 and immobilizes the latter axially with respect to the intermediate casing. The connecting nut 20 is therefore a cylindrical part with an inner thread 21, an outer centering track 23 and teeth 22 in the axial upstream extension of its cylindrical wall.

Figure 3:
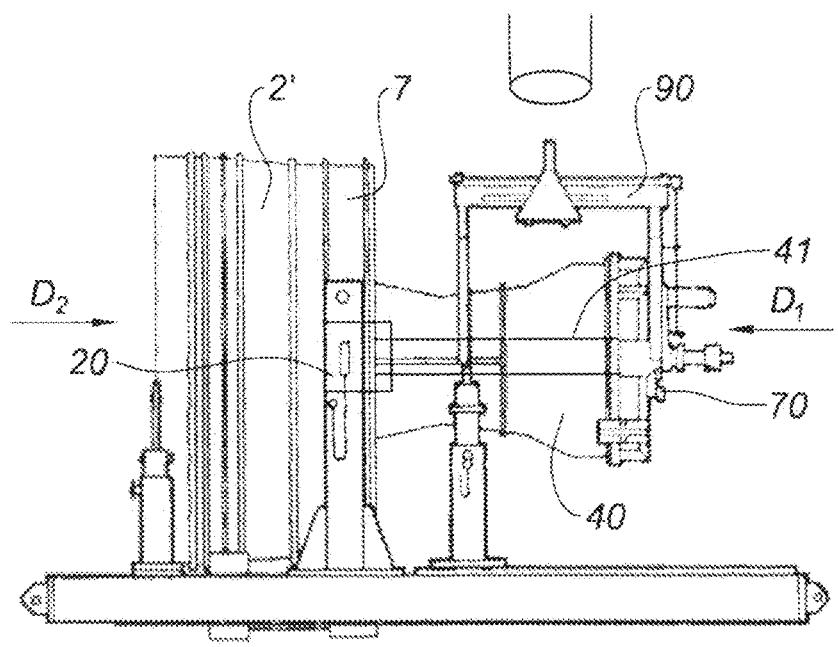
FIG. 3 is a schematic side view of the engine during dismantling.
Figure 4:
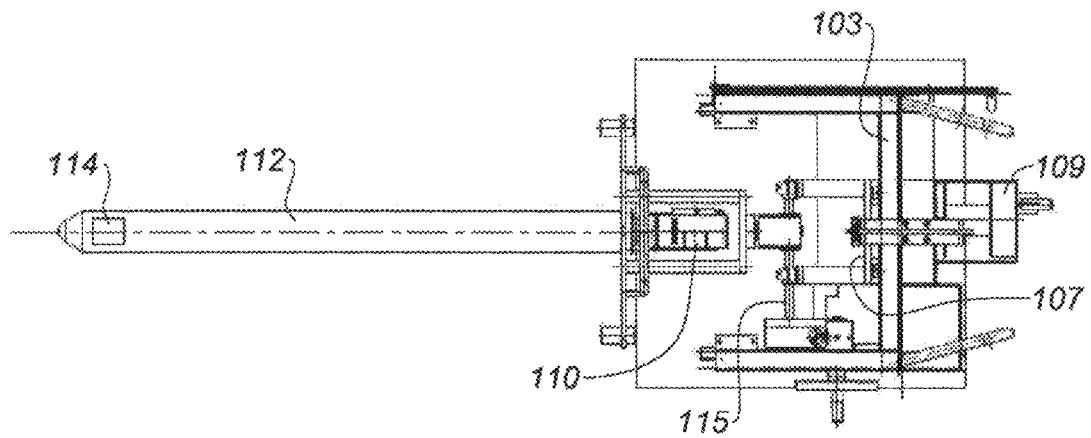
FIGS. 4 and 5 represent one embodiment of the device for heating the connecting nut.
Figure 5:
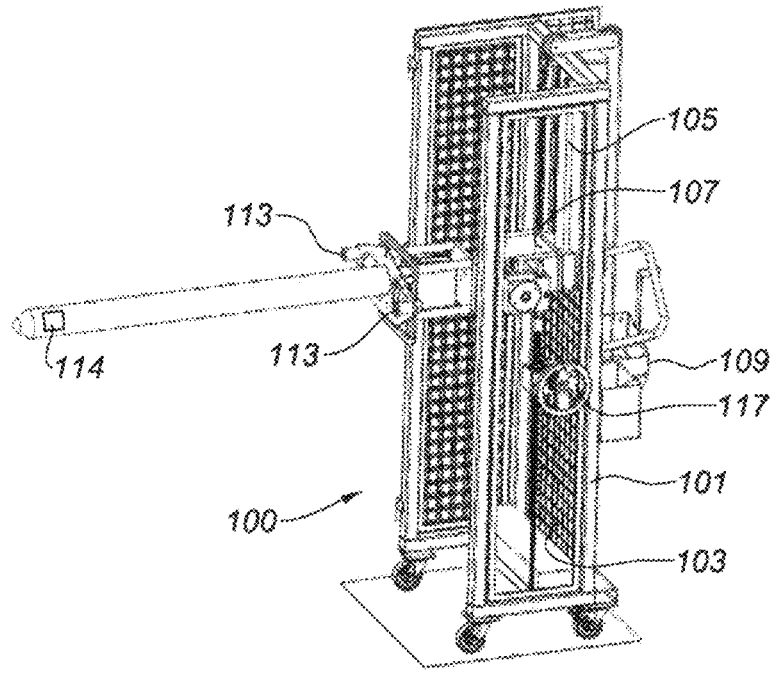

Removing the HP module 40 involves, beforehand, removing the LP module 60 so as to free up access to the nut 20 and putting in place a disk 70 for retaining the HP rotor in its casing, thus replacing the inter-shaft bearing. This disk replaces the downstream inter-shaft bearing which has been removed with the LP module 60. The state of the engine is represented schematically in FIG. 3. The front portion, comprising the fan casing and the intermediate casing, is secured to a frame and the rear portion which is to be detached from the intermediate casing is the HP module 40. It is attached to a beam 90 suspended from a hoist.

The following step involves introducing, into the guiding tube 41 put in place in the central space freed up by the shaft of the LP turbine, the means 100 for heating the nut 20.

It comprises a trolley 101 mounted on wheels and having a vertical wall 103 provided with vertical rails 105 guiding a platform 107 which can move vertically. The platform is suspended from a cable which is connected, via a set of pulleys, to a manually operated winch 109 by means of which the height of the platform can be adjusted. The platform 107 supports the heating assembly consisting of a heating unit 110 and a hollow tube 112. The heating unit is arranged at the proximal end of the tube so as to produce a flow of hot air in the hollow tube 112, directed toward the other end of the latter. This other end is open laterally with holes 114 cut into the wall of the tube 112, about the axis of the latter. The heating assembly also comprises a means for siting the tube and wedging it in position when it is introduced into the engine. This means is formed here by two projections 113 on a transverse plate.

The heating assembly is mounted on the platform via the intermediary of a horizontal rotation spindle 115 such that it is possible to pivot it into a vertical storage position, in which it is stowed in the trolley, or into a horizontal active position. The angular position of the heating assembly is controlled by a handwheel 117 arranged on the side of the trolley. An appropriate mechanism transmits the movement of rotation of the handwheel to the rotation of the heating assembly about the horizontal spindle 115.

In order to heat the connecting nut 20, the trolley is placed facing the engine and in line with the axis thereof, the heating element is brought to horizontal and introduced into the guiding tube 41 until the projections 113 are in abutment in their respective housings created in the retaining disk 70. The end of the tube is then level with the nut. The heating unit is switched on and the hot air is blown in via holes 114 of the tube toward the connecting nut. The increase in the temperature of the connecting nut is monitored, and must not exceed 130° C. When the temperature is reached, the heating unit is switched off and the trolley is withdrawn and put away.

The second step concerns unscrewing the nut with introduction of the tooling 200 from the turbine, at the rear, into the guiding tube 41. To that end, use is made of an unscrewing tooling comprising an unscrewing tube at the end of which are mounted four fingers which can be moved between a retracted position within said tube, allowing the tube to be moved along the inner tubular space 41, and a deployed position in which they extend radially out from the cylindrical wall of the unscrewing tube. In this latter position, and by applying a rotational torque about the axis of the tube, the four fingers press against a lateral edge of each tooth and transmit the unscrewing forces thereto. By providing a number of fingers which is equal to the number of teeth of the connecting nut, a better distribution of the forces, compared to with only two fingers, is ensured. It follows that a higher torque can be applied, increasing the chances of managing to loosen the nut.

Figure 6:
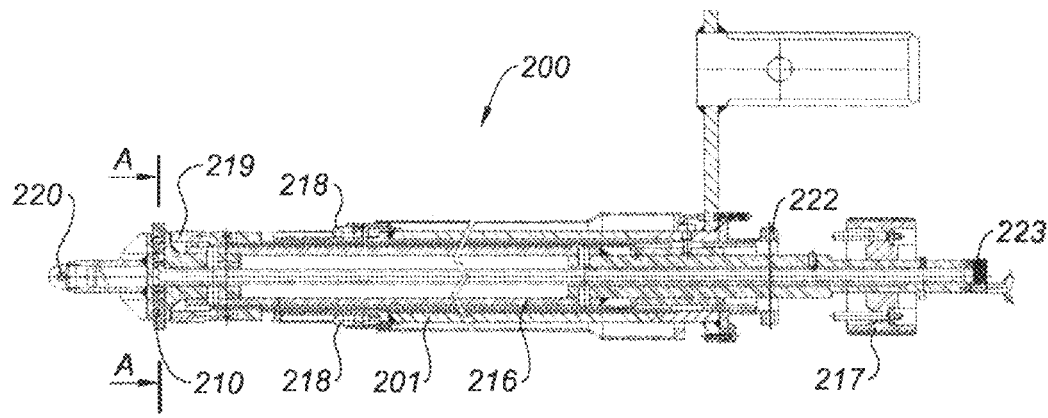
FIGS. 6, 7 and 8 represent one embodiment of the device for unscrewing the connecting nut, with introduction via the rear, on the turbine side.
Figure 7:
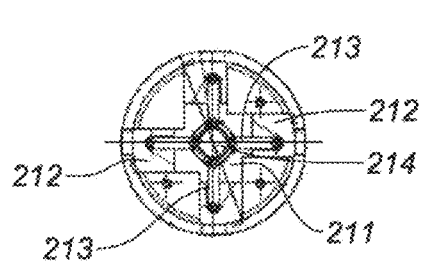
Figure 8:
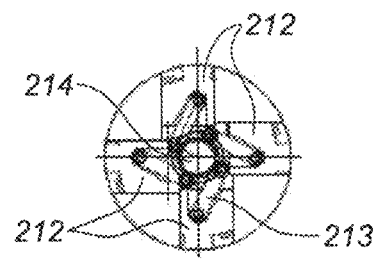

FIGS. 6 to 8 show a section of a tooling suited to the method. This tooling 200 comprises a tubular element 201 inside which is housed the mechanism for deploying and then retracting the fingers for contact with the teeth of the connecting nut.

The mechanism for actuating the fingers comprises a disk 210 arranged across the tube, at the end thereof; the disk has four radial grooves 211 arranged in a cross, for housing each of the fingers 212. These are connected to connecting rods 213 which are articulated to an actuating member 214, as shown in FIGS. 7 and 8 for two positions of the fingers. By turning the actuating member on itself, about its axis, one way or the other, the fingers are made to adopt, by means of the action of the connecting rods, a retracted or extended position, depending on the direction. The disk 210 is secured to a tubular element 216 surrounding the member 214 for actuating the fingers. The tubular element 216 is secured to a toothed wheel 217 in order to be driven in rotation. The tubular element 201 is arranged so as to be made immobile with respect to the HP module 40. To that end, it comprises projections which are not shown here and which, as in the means for heating the connecting nut, engage with the retaining disk 70. At its other end, the tube is provided with pegs 218 which are designed to be engaged in grooves of the HP rotor journal in order to help prevent any rotation of the HP rotor 35 while the loosening torque is applied to the nut. Finally, the tube 201 is associated with vanes 219 which are able to move radially, actuated by the handwheel 222, and which serve to extract the brake of the nut 20 before loosening.

An upstream guiding member 220 is also shown in this figure. It is of smaller diameter than the tube 201 and serves to center the tooling 200 via a tooling which is provided to that end and which is mounted on the fan 2.

After heating the connecting nut, the tooling is introduced into the central space until the lateral projections, not shown, abut against the device 110. The disk is then facing the teeth of the nut. The fingers are then deployed radially by means of a determined angular rotation of the control member 223*t*. With one or more fingers having a lateral tab, the disk is turned such that the tabs slide into the corresponding grooves created below the teeth.

In the abutment position, it is known that, at the upstream end of the tube (not shown from the rear), the axial pegs are engaged in the corresponding axial grooves of the inside of the journal of the HP rotor 35. While still in position and wedged, a torque multiplier, for example that known under the Sweeney brand, is put in place.

It is ascertained that the connecting nut has not seized, by means of a break-action torque wrench calibrated to the maximum permitted torque. If the wrench yields and folds in two, the maximum permitted torque has been exceeded; the nut is deemed to be stuck, and unscrewing from the front must be attempted. If the wrench does not break, a motor, for example a compressed air motor, is put in place on the torque multiplier and the connecting nut is first loosened and then unscrewed.

The method for removing the connecting nut from the front involves, first of all, removing the assembly formed by the fan, the boost compressor and the bearings P1 and P2 in order to have a direct view of the nut from the front.

Figure 9:
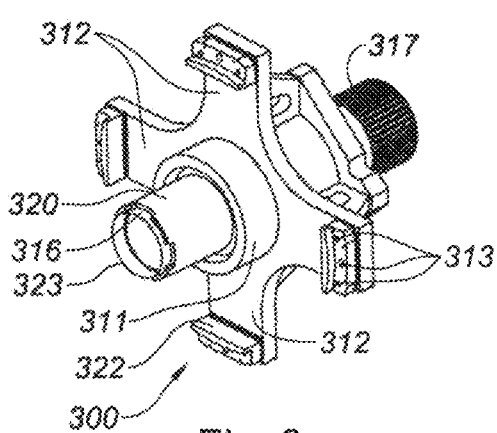
FIGS. 9 to 11 show the tooling for unscrewing via the front of the engine, with the support and the tubular key.
Figure 10:
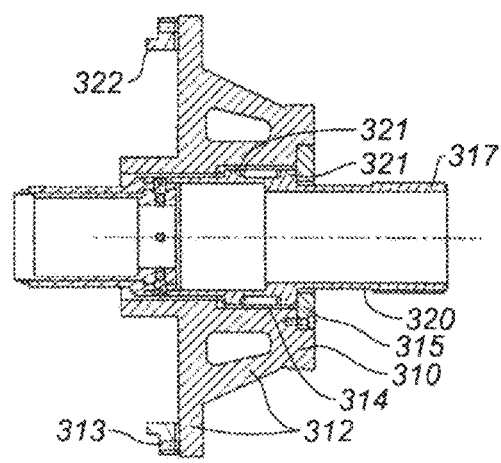
Figure 11:
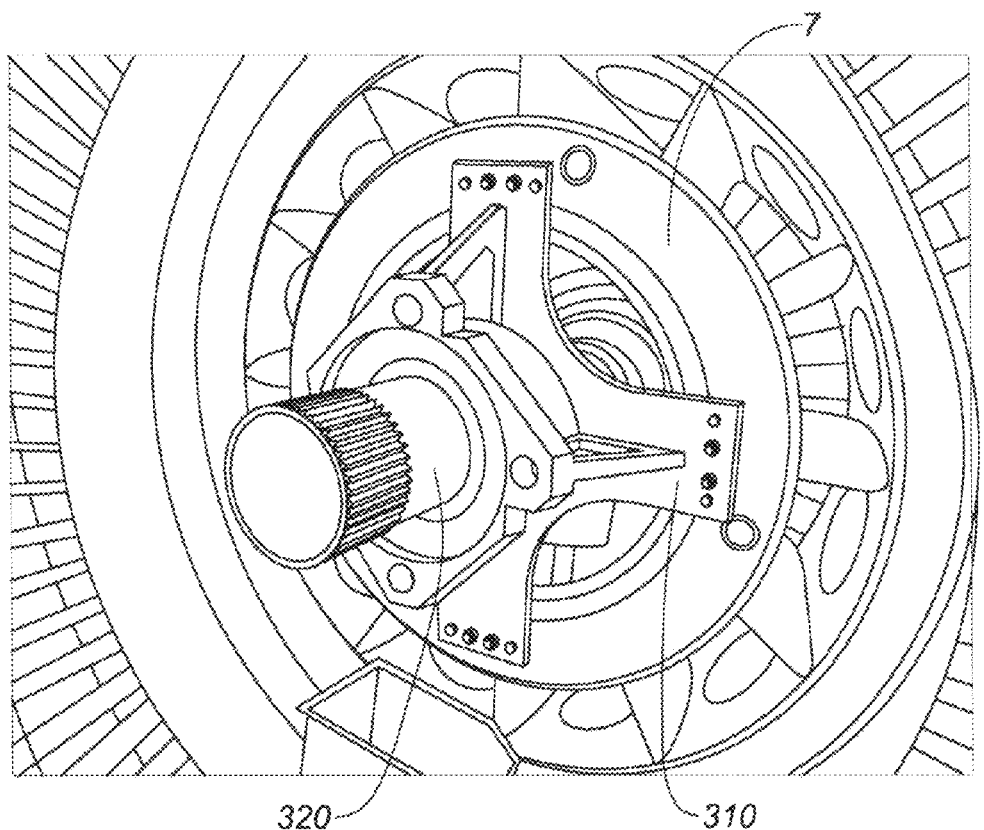

As in the method for removing via the turbine, and in the same manner, the connecting nut is heated beforehand with the aid of the tooling 100. Then, the front unscrewing tool 300 is put in place on the engine, FIGS. 9, 10 and 11. The tool comprises two parts: a key support 310 secured to the casing of the engine, and a tubular key 320 which is able to turn about its axis in the support. The assembly is shown in FIG. 9. The support 310 comprises four branches 312 which extend in a star shape from a cylindrical stem 311. The support comprises removable shoes 322. The operator installs shoes which are appropriate for the type of engine, such that it is possible to attain the correct interfaces for attachment to the casing. The branches and the shoes 322 have at their end holes 313 through which can pass screws for attaching to the intermediate casing. The tubular key 320 is housed in the cylindrical stem such that it is blocked axially but can rotate freely about its axis. The key comprises two circular supporting surfaces 321 which come to place themselves in the corresponding ring 314. A removable ring 315 closes the space of the groove in the upstream direction so as to lock the key axially in the support. The key comprises, at one end, four teeth 316 of a shape complementary with the teeth 22 of the connecting nut 20 and, at its other end, a pinion 317 for driving it in rotation. The key also comprises a thin ring 323 which serves to push away the brake of the nut 20 before loosening.

Figure 12:
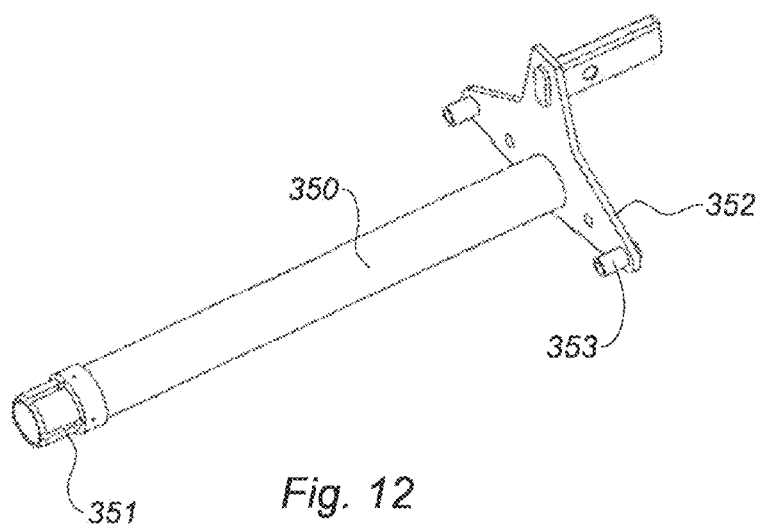
FIG. 12 shows, in isometric section, the tool for preventing the HP rotor from rotating.

Once the tool 300 has been put in place, a wedging tube 350, FIG. 12, is arranged inside the HP rotor so as to prevent it from rotating. This tube comprises a transverse plate with locating projections 353 which come into abutment in corresponding notches in the disk 70. Pegs 351, which engage with axial grooves of the HP rotor so as to immobilize the latter, are placed at the end of the tube.

The operating method comprises the following steps:
Heating the connecting nut by means of the heating device 100 up to a temperature not exceeding 130° C.
Putting in place the rear loosening tooling 200.
Putting in place a force multiplier on the pinion, for example a device of the Sweeney type.
Ascertaining that the connecting nut can be loosened by applying a torque lower than the limit permitted by the manufacturer, by means of a break-action torque wrench engaged in the Sweeney force multiplier.
If the wrench allows the pinion to be rotated without folding, then the connecting nut has not seized and a pneumatic motor is put in place to drive the pinion.

If the torque wrench indicates that the maximum torque has been exceeded, loosening via the front must be contemplated.

Heating via the front comprises the following steps:

Heating the connecting nut by means of the heating device 100, up to a temperature not exceeding 130° C.

Putting in place the front loosening tooling 300.

Mounting the support 310 onto the intermediate casing and screwing the four branches to the orifices existing therein.

Introducing the unscrewing key 320 into the stem of the support until the toothed end is engaged between the teeth of the nut.

Axially locking the key by means of the ring 315 on the support.

Preventing the HP rotor 35 from rotating, for example by means of a wedging tube 350 provided with wedging pegs.

Putting in place a force multiplier on the pinion 317, for example a device of the Sweeney type.

Ascertaining that the connecting nut can be loosened by applying a torque lower than the limit permitted by the manufacturer, by means of a break-action torque wrench engaged in the Sweeney force multiplier.

If the wrench allows the pinion to be rotated without folding, then the connecting nut has not seized and a pneumatic motor is put in place to drive the pinion.

If the torque wrench indicates that the maximum torque has been exceeded, cutting the nut must be contemplated.

The method of the invention is thus an improvement with respect to the prior art since, with this method, it has been noted that the number of instances of the nut being cut after application of the procedure has been reduced considerably and notably.

The invention claimed is:

1. A method for dismantling a twin-spool turbofan including a front fan, a high pressure (HP) module including a high pressure (HP) rotor, a low pressure (LP) turbine module including a low pressure (LP) turbine and a low pressure (LP) turbine shaft, and an intermediate casing including a bearing for supporting the HP rotor, the HP rotor being retained in the bearing by a connecting nut, the method comprising:
removing LP turbine module to provide access to the connecting nut;
once the LP turbine module, with the LP turbine shaft, has been removed, introducing a guiding tube into a central space left free by the LP turbine module such that an end of the guiding tube is level with the connecting nut;
heating the connecting nut with a heating device;
after heating the connecting nut, introducing a rear unscrewing tool for unscrewing the connecting nut; and
applying an unscrewing torque to the rear unscrewing tool, the unscrewing torque being maintained at a predetermined value below that at which forces applied on teeth of the connecting nut by the rear unscrewing tool would risk damaging the teeth of the connecting nut,
wherein the method further comprises, in a case of an unsuccessful attempt of dismantling via the rear unscrewing tool, removing the fan so as to free up the connecting nut in a forward direction, heating the connecting nut, and putting a front unscrewing tool in place for applying an unscrewing torque to the connecting nut,
wherein the heating device includes a heating unit arranged at a first end of a hollow tube which produces a flow of hot air which directed toward holes at a second end of the hollow tube,
wherein the heating includes inserting the heating device into the guiding tube and turning the heating device on so that the flow of hot air is blown toward the connecting nut via the holes, and
wherein a temperature of the connecting nut does not exceed 130° C. during the heating.

2. The method as claimed in claim 1, wherein the front unscrewing tool comprises a tubular element including teeth of a shape complementary with a shape of teeth of the connecting nut.

3. The method as claimed in claim 2, wherein the tubular element of the front unscrewing tool is placed in a support attached to a casing of the engine, the support forming a contact point for applying the unscrewing torque.

4. The method as claimed in claim 1, wherein the rear unscrewing tool comprises a tube and a plurality of fingers which are retractable between a position in which the plurality of fingers is housed within the tube and a position in which the plurality of fingers deployed radially to come into contact with teeth of the connecting nut.

5. The method as claimed in claim 1, further comprising, after the removing the LP turbine module, preventing the HP rotor from rotating by engaging a tubular element in a space left free by the LP turbine module and which is attached at a first end to a casing of the HP module and which is secured in rotation at a second end with the HP rotor.

6. The method as claimed in claim 1, further comprising, before applying an unscrewing torque, ascertaining that the connecting nut has not seized by applying a break-action torque wrench calibrated to a maximum permitted torque on a pinion of the tool for unscrewing the connecting nut and determining if the break-action torque wrench is able to rotate the pinion without folding.

7. The method as claimed in claim 1, wherein the heating device includes a trolley on which the hollow tube is mounted.

* * * * *

UNITED STATES PATENT AND TRADEMARK OFFICE
CERTIFICATE OF CORRECTION

PATENT NO. : 9,878,407 B2  
APPLICATION NO. : 14/397009  
DATED : January 30, 2018  
INVENTOR(S) : Fabrice Tailpied et al.

Page 1 of 1

It is certified that error appears in the above-identified patent and that said Letters Patent is hereby corrected as shown below:

In the Specification

Column 3, Line 55, change "from right to left" to --from left to right--; and

Column 5, Line 64, change "the control member 223t" to --the control member 223--.

Signed and Sealed this
Fourteenth Day of January, 2020

Andrei Iancu
*Director of the United States Patent and Trademark Office*